US012691629B2

(12) United States Patent
Demir et al.

(10) Patent No.: US 12,691,629 B2
(45) Date of Patent: Jul. 28, 2026

(54) MOLD AND STRETCH-BLOW MOLDED POLYESTER BOTTLE

(71) Applicant: ALPLA WERKE ALWIN LEHNER GMBH & CO. KG, Hard (AT)

(72) Inventors: Adem Demir, Lauterach (AT); Andreas Rehders, Weselberg (DE)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 85 days.

(21) Appl. No.: 18/692,264

(22) PCT Filed: Sep. 13, 2022

(86) PCT No.: PCT/EP2022/075431
§ 371 (c)(1),
(2) Date: Mar. 14, 2024

(87) PCT Pub. No.: WO2023/041533
PCT Pub. Date: Mar. 23, 2023

(65) Prior Publication Data
US 2024/0253294 A1     Aug. 1, 2024

(30) Foreign Application Priority Data

Sep. 14, 2021     (CH) ............................... 070266/2021

(51) Int. Cl.
*B29C 49/54*          (2006.01)
*B29C 49/00*          (2006.01)
(Continued)

(52) U.S. Cl.
CPC ........ *B29C 49/541* (2013.01); *B29C 49/0005* (2013.01); *B29C 49/30* (2013.01); *B65D 1/0207* (2013.01); *B65D 1/0261* (2013.01); *B29C 49/1212* (2022.05); *B29C 2049/4882* (2013.01); *B29C 2049/4892* (2013.01);
(Continued)

(58) Field of Classification Search
CPC ........... B29L 2031/7158; B29C 49/541; B29C 2049/4892; B29C 2049/4889; B29C 2049/4882; B65D 1/0261; B65D 1/0276
See application file for complete search history.

(56) References Cited

U.S. PATENT DOCUMENTS

2006/0231985 A1     10/2006   Kelley et al.
2008/0283533 A1     11/2008   Tilton et al.
(Continued)

*Primary Examiner* — John J DeRusso
(74) *Attorney, Agent, or Firm* — Morris O'Bryant Compagni Cannon, PLLC

(57)     ABSTRACT

A mold for producing a stretch-blow molded polyester bottle from a preform comprises mold parts that can be shifted between an open position and a closed position. The mold comprises: first and second mold shell, within which, in the closed position, a bottle body can be molded; a holding stopper, which can be inserted into a bottle neck; a blow pin having a compressed-air intake for biaxial stretching of the preform; and a bottom part, which closes the two mold shells at the bottom side and is configured to mold the bottle bottom. A base is formed on the bottom part, which base projects into an interior of the mold and has a side wall with an inclination angle (α) of at most 5 degrees with respect to a vertical axis (35) of the mold and is oriented in parallel with the vertical axis.

9 Claims, 2 Drawing Sheets

(51) Int. Cl.

| | | |
|---|---|---|
| *B29C 49/12* | (2006.01) | |
| *B29C 49/30* | (2006.01) | |
| *B29C 49/48* | (2006.01) | |
| *B29K 67/00* | (2006.01) | |
| *B29L 31/00* | (2006.01) | |
| *B65D 1/02* | (2006.01) | |

(52) U.S. Cl.
CPC ... *B29K 2067/00* (2013.01); *B29L 2031/7158* (2013.01); *B65D 1/0276* (2013.01)

(56) References Cited

U.S. PATENT DOCUMENTS

| | | | |
|---|---|---|---|
| 2015/0328825 A1 | 11/2015 | Bunel et al. | |
| 2016/0346986 A1* | 12/2016 | Van Dijck | B29C 49/20 |
| 2019/0232545 A1* | 8/2019 | Tabata | B29C 49/46 |
| 2024/0101299 A1* | 3/2024 | Stelzer | B65D 1/0284 |

* cited by examiner

MOLD AND STRETCH-BLOW MOLDED POLYESTER BOTTLE

CROSS-REFERENCE TO RELATED APPLICATIONS

This application is a national phase entry under 37 U.S.C § 371 of PCT/EP2022/075431 filed Sep. 13, 2022, which claims priority to Swiss Patent Application No. 070266/2021 filed Sep. 14, 2021, the entirety of each of which is in-corporated by this reference.

FIELD OF THE INVENTION

The invention relates to a mold for producing a stretch-blow-molded polyester bottle and a resulting stretch-blow-molded polyester bottle.

PRIOR ART

Stretch-blow-molded bottles made of polyester are produced from an injection-molded preform on which the bottle neck with an external thread is already formed. The bottle body is formed in a blow mold in that the preform body is biaxially stretched in the blow mold. This is done by means of a blow pin.

It goes without saying that developments with regard to an increase in productivity are geared toward shortening the cycle times of bottle production. The problem with this is that, with short cycle times, a bottle that has just been produced is affected by the property of PET that it wants to return to the initial shape of the preform during cooling. This means that the molding of the bottom does not function reliably in series production. The part of the bottom which is molded inward during stretch blow molding recedes and accordingly moves from its inner position back into its outwardly curved shape of the preform bottom. Due to this resetting of the bottom, the stability of the bottle is no longer given.

This resetting effect could be prevented by extended cycle times or improved cooling. However, these measures increase costs and accordingly represent an undesired solution.

Advantages of the Invention

The disadvantages of the described prior art result are addressed by providing a polyester bottle which, even at reduced cycle times, has a stable base and can nevertheless be produced cost-effectively.

SUMMARY OF THE INVENTION

With a mold for producing a stretch blow-molded polyester bottle, the solution to the posed problem is achieved by the features listed in the independent claims. Developments and/or advantageous alternative embodiments form the subject-matter of the dependent claims.

The invention comprises a base that is formed on a bottom part and projects into an interior of the mold, and its side wall has an inclination angle of at most 5 degrees with respect to the vertical axis of the mold and is oriented in parallel with the vertical axis of the mold. The base forms an indentation with a steep side wall on the bottle bottom. As a result, the bulge does not protrude beyond the standing surface of the standing surface of the bottle, since the restoring force of the polyester is insufficient to do this. In addition, the base stretches the bottle bottom in such a way that polyester material is stretched further inward. As a result, the restoring force is further reduced, and the reduced polyester material cools more rapidly. The more rapid cooling results in another reduction of the restoring force of the bottom. The bottle produced in a short cycle time therefore has a stable standing surface since the indentation can no longer bulge outward beyond the standing surface.

It has proven to be useful if the negative mold for the outer part of the standing surface of the bottle bottom is formed at the lower ends of the first and second mold shells. Since the mold shells are open, the negative molds of the outer standing surfaces can be produced more easily than if they were provided on the bottom part.

The negative mold for the inner part of the standing surface of the bottle bottom is expediently formed on the base following the side wall. The negative molds can be produced easily, since the bottom part is designed to be open and the negative molds formed on the molded parts are not formed on the bottom part.

In another embodiment of the invention, the base projects beyond the rest of the bottom part with a height between 5 and 7 mm. This height measurement also contributes to the fact that the indentation of the bottle bottom cannot extend beyond the standing surface of the bottle bottom and the bottle is unstable.

Another aspect of the invention relates to a polyester bottle which is produced in the mold described above.

The invention also provides that the indentation has a side wall which has a side wall angle relative to the horizontal standing surface between 60 and 80 degrees and advantageously between 65 and 70 degrees. The side wall angle is somewhat smaller than 90 degrees, since the toughness of the polyester does not allow a 90 degrees angle to build up relative to the horizontal. However, the side wall angle that occurs is steep or large enough that the restoring forces of the indentation do not suffice for the same to protrude beyond the standing surface of the bottle. Despite a cycle time of less than 2 seconds, the bottle therefore sits stable.

In another embodiment of the invention, the polyester material of the indentation is forcibly stretched by the steep side wall angle in the direction of the bottle interior. The restoring force of the indentation is thereby reduced.

Due to the fact that the restoring forces of the polyester of the indentation are reduced by the steep side wall angles, it is impossible for the indentation to reset and bulge beyond the standing surface.

In an advantageous manner, the bottle is produced with a cycle time which is between 10% to 20% shorter than the cycle time required for an identical bottle, but with a conventionally molded bottom. The shortened cycle time is, for example, between 1.8 and 2 seconds. Despite the very short cycle time, the bottle sits stable.

BRIEF DESCRIPTION OF THE DRAWINGS

Further advantages and features will become apparent from the following description of an embodiment of the invention with reference to the schematic drawings. In the figures, in a representation that is not to scale.

DETAILED DESCRIPTION OF THE INVENTION

Figure 1:
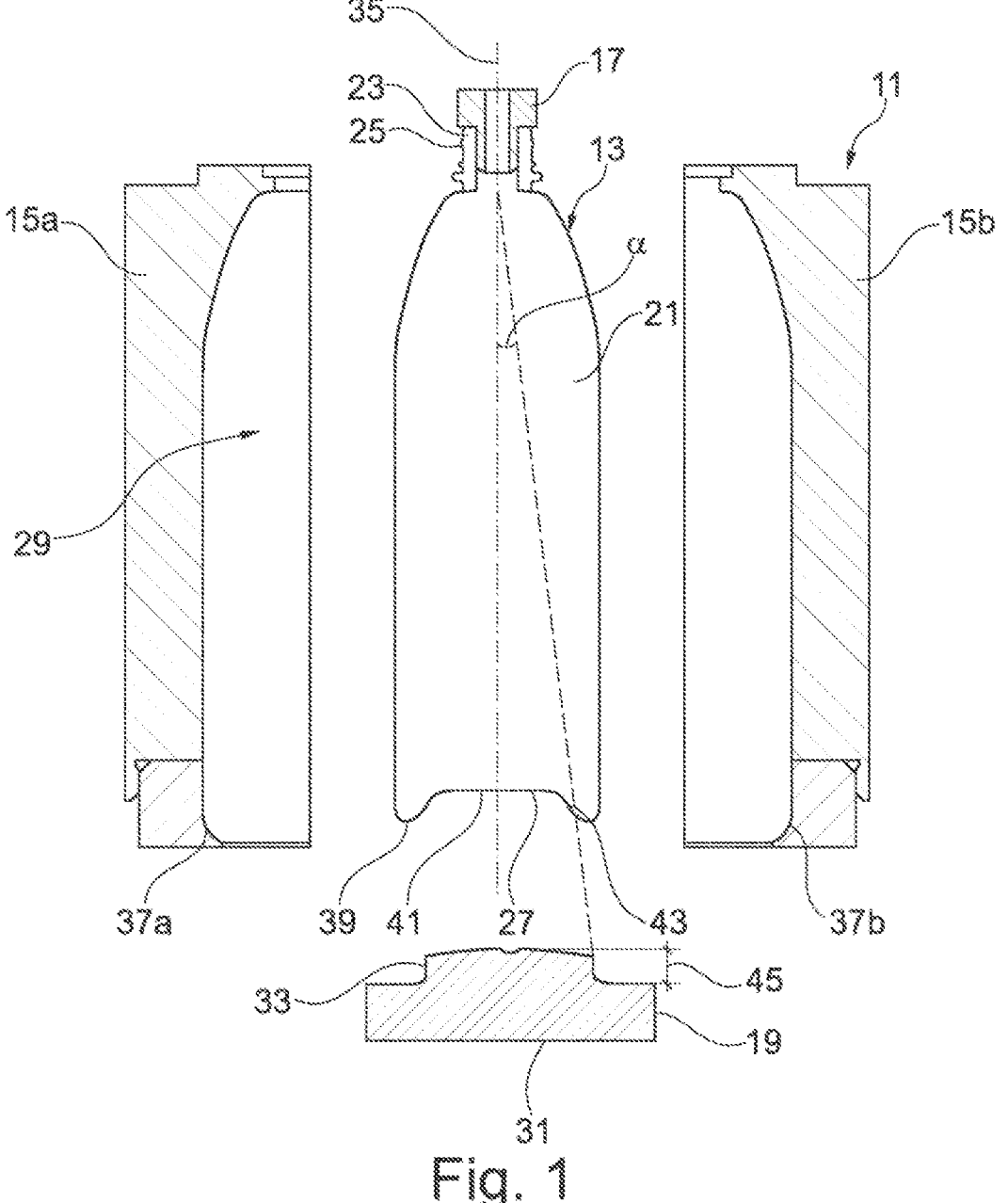
FIG. 1: shows a sectional view of a mold in an open position along the vertical axis and a polyester bottle produced in the mold.
Figure 2:
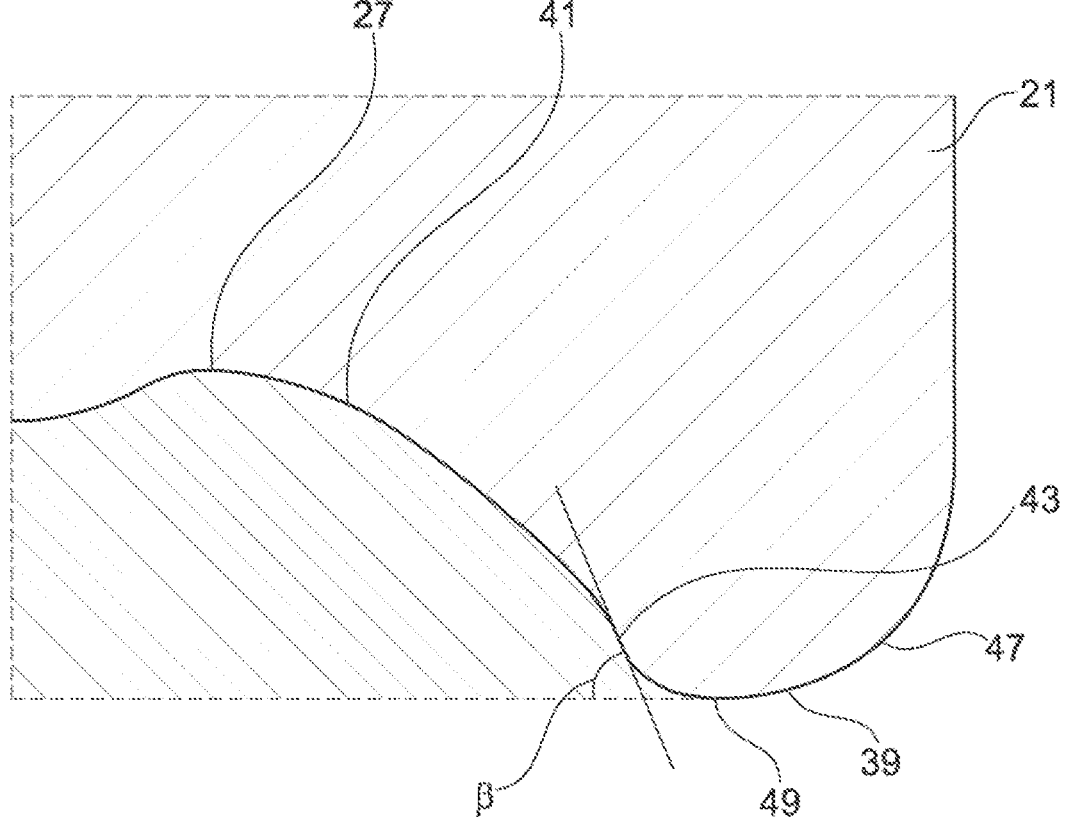
FIG. 2: shows a detailed view of the bottle bottom.

FIG. 1 shows a mold which is denoted as a whole by reference sign 11. A polyester bottle 13 is stretch-blow-molded in the mold 11. The polyester can be PET, PEF or another bio-based polyester.

The mold 11 has a first and a second mold shell 15a, 15b, a holding stopper 17, a blow pin (not shown in FIG. 1) and a bottom part 19. The mold shells 15a, 15b and the bottom part 19 can be displaced between an open position and a closed position. In the closed position, a preheated preform is stretched in the axial direction by inserting the blow pin and inflated or radially stretched by introducing compressed air into the blow pin. The polyester bottle 13 is therefore produced in a known manner by the preform being biaxially stretched. After the bottle 13 has been formed, the mold shells 15a, 15b and the bottom part 19 are moved into the open position, and the bottle 13 is ejected from the mold 11.

The bottle body 21 is formed in the interior 29 between the two closed mold shells 15a, 15b. On the upper side, the bottle body 21 is closed by a bottle neck 23, mostly with an external thread 25. The bottle neck 23 is injection molded during the production of the preform and remains unchanged during stretch blow molding. The holding stopper 17 is inserted into the bottle neck 23.

The bottle bottom 27, which closes the bottle body 21 on the underside, receives its shape from the bottom part 19. A base 31 projecting into the interior 29 of the mold 11 is formed on the bottom part 19. The base 31 has a side wall 33 which is advantageously parallel to the vertical axis 35 of the mold 11. It is also conceivable that the side wall 33 has a small inclination angle α of at most 5 degrees relative to the vertical axis 35.

The standing surface 39 is formed between the side wall 33 and the lower ends 37a, 37b of the mold shells 15a, 15b. The vertical side wall 33 makes it possible for the base 31 to form an indentation 41 with a steep side wall 43 on the bottle bottom 27. The side wall angle β is advantageously between 65 and 70 degrees, since the tough polyester is somewhat reduced after the angle β is formed to 90 degrees by the base 31.

Due to the 90° stretching to the inside, the bottle bottom 27 can no longer bulge outwards even if the bottle 13 is produced with a very short cycle time, which is between 10% to 20% shorter than the cycle time which is required for an identical bottle but with a conventionally shaped bottom. The bottle 13 thereby sits stable since the indentation 41 always lies lower than the standing surface 39. At the same time, excess material is stretched further inward on the bottle bottom 27. Due to the forced stretching caused by the base 31, less material is also present in the region of the bottle bottom 27. This reduced material rapidly cools, whereby the restoring force of the indentation is reduced in addition to the steep side wall angle β. A base height 45 of 5 to 7 mm is sufficient to create a sufficiently deep indentation 41.

The outer part 47 of the standing surface 39 is formed at the lower ends of the mold shells 15a, 15b. The negative mold for the inner part 49 of the standing surface 39 of the bottle bottom 27 is formed on the base 31 following the side wall 33.

The design of the base 31, in particular its vertical side wall 33, means that the indentation 41 does not bulge or move outwards at any time, even with a very short cycle time. The cycle time is typically between 10% to 20% shorter than the cycle time which is required for an identical bottle but with a conventionally molded bottom. As a result, the polyester bottle 13 can be produced in the mold 11 in a very short time and nevertheless sits stable.

The invention claimed is:

1. A mold for producing a stretch-blow-molded polyester bottle having a bottle neck, a bottle body, and a bottle bottom from a preform, comprising a first mold shell and a second mold shell configured to mold the bottle body when the first and second mold shells are in a closed position, a holding stopper configured to be inserted into the bottle neck, a blow pin having a compressed-air intake for biaxial stretching of the preform, a bottom part that closes the two mold shells on the bottom side and is configured to mold the bottle bottom, and a base formed on the bottom part that includes only a single projection that projects into an interior of the mold, the base having a side wall oriented in parallel with the vertical axis of the mold, wherein the base projects beyond the remaining bottom part at a height between 5 and 7 mm.

2. The mold according to claim 1, wherein a negative form for an outer part of a standing surface of the bottle bottom is formed at lower ends of the first and second mold shells.

3. The mold according to claim 2, wherein a negative mold for an inner part of the standing surface of the bottle bottom is formed on the base following the side wall.

4. A stretch-blow-molded polyester bottle comprising:

a bottle neck, a bottle body adjoining the bottle neck, a bottle bottom having an outer standing surface and only a single inner indentation delimited by the standing surface, the bottle produced with a mold, comprising:

a first mold shell and a second mold shell configured to mold the bottle body when the first and second mold shells are in a closed position, a holding stopper configured to be inserted into the bottle neck, a blow pin having a compressed-air intake for biaxial stretching of a preform, a bottom part that closes the two mold shells on the bottom side and is configured to mold the bottle bottom, and a base formed on the bottom part that includes only a single projection that projects into an interior of the mold, the base having a side wall oriented in parallel with the vertical axis of the mold, wherein the base projects beyond the remaining bottom part at a height between 5 and 7 mm.

5. The polyester bottle according to claim 4, wherein the inner indentation has a side wall which has a side wall angle (β) relative to the outer standing surface between 60 and 80 degrees.

6. The polyester bottle according to claim 5, wherein polyester material of the inner indentation is forcibly stretched by the side wall angle (β) in a direction of an interior of the bottle.

7. The polyester bottle according to claim 6, wherein restoring forces of the polyester material of the inner indentation are reduced by the side wall angle (β).

8. The polyester bottle according to claim 4, wherein the bottle is produced in the mold with a cycle time between 10% to 20% shorter than a cycle time required for an identical bottle but with a conventionally molded bottom.

9. The polyester bottle according to claim 4, wherein the inner indentation has a side wall which has a side wall angle (β) relative to the outer standing surface between 65 and 70 degrees.

\* \* \* \* \*